United States Patent
Yamamoto et al.

(10) Patent No.: US 8,038,977 B2
(45) Date of Patent: Oct. 18, 2011

(54) CARBON POWDER SUITABLE AS A NEGATIVE ELECTRODE MATERIAL FOR NONAQUEOUS SECONDARY BATTERIES

(75) Inventors: Hiroshi Yamamoto, Ikeda (JP); Tooru Fujiwara, Nishinomiya (JP)

(73) Assignee: Chuo Denki Kogyo Co., Ltd., Niigata (JP)

( * ) Notice: Subject to any disclaimer, the term of this patent is extended or adjusted under 35 U.S.C. 154(b) by 456 days.

(21) Appl. No.: 12/068,437

(22) Filed: Feb. 6, 2008

(65) Prior Publication Data

US 2009/0196816 A1    Aug. 6, 2009

(51) Int. Cl.
*C01B 31/04* (2006.01)

(52) U.S. Cl. .................... 423/448; 423/445 R; 252/502; 361/305

(58) Field of Classification Search ............... 423/448, 423/445 R; 252/502; 361/305
See application file for complete search history.

(56) References Cited

U.S. PATENT DOCUMENTS 5,607,770 A * 3/1997 Lewis et al. ............ 428/408

FOREIGN PATENT DOCUMENTS

| | | |
|---|---|---|
| JP | 04-368778 | 12/1992 |
| JP | 8-50897 | 2/1996 |
| JP | 09-213328 | 8/1997 |
| JP | 2000-58052 | 2/2000 |
| JP | 2003-100292 | 4/2003 |
| JP | 2003-272625 | 9/2003 |

* cited by examiner

*Primary Examiner* — Daniel C. McCracken
(74) *Attorney, Agent, or Firm* — Clark & Brody

(57) ABSTRACT

Carbon powder having low temperature calcined carbon derived from pitch adhered to a portion of the surface of natural graphite powder is obtained by solids mixing of natural graphite powder and pitch powder as a carbon precursor followed by heat treatment at 900-1500° C. to carbonize the pitch. The amount of pitch powder is such that the ratio V2/V1 of the pore volume V2 of pores having a diameter of 50-200 nm to the pore volume V1 of pores having a diameter of 2-50 nm in a pore size distribution curve obtained by analysis of the nitrogen desorption isotherm of the resulting carbon powder by the BJH method is at least 1. This carbon powder can be used as a negative electrode material for a nonaqueous secondary battery able to operate at low temperatures.

3 Claims, No Drawings

CARBON POWDER SUITABLE AS A NEGATIVE ELECTRODE MATERIAL FOR NONAQUEOUS SECONDARY BATTERIES

TECHNICAL FIELD

This invention relates to an inexpensive graphite-based carbon powder comprising natural graphite powder having turbostratic carbon with a low degree of graphitization adhering to a portion of the surface of the graphite powder. The carbon powder is particularly suitable as a negative electrode material for nonaqueous secondary batteries which can be used at low temperatures.

BACKGROUND ART

The use of lithium ion secondary batteries as power supplies for portable electronic equipment is rapidly spreading. Carbon powder is used as the negative electrode material of a nonaqueous secondary battery typified by a lithium ion secondary battery. Due to the demand for small batteries with higher capacity, it has been attempted to increase the discharge capacity of negative electrode materials. To this end, synthetic graphite powder having a high degree of graphitization is primarily used as a negative electrode material for the current nonaqueous secondary batteries. In addition, in order to further increase the discharge capacity of a battery per unit volume, it has been attempted to increase the packing density of electrodes so as to make the electrode density higher.

There is another desire to lower the cost of negative electrode materials for nonaqueous secondary batteries. Particularly in large-sized batteries such as those for automobiles, since a large amount of negative electrode materials is used, there is an increasing demand for lower their costs. On this account, attempts have been made to use natural graphite, which is inexpensive and which has a high degree of graphitization and a high true specific gravity, in place of expensive synthetic graphite.

However, due to its extremely high degree of graphitization, natural graphite has problems such as a high reactivity with an electrolytic solution, which leads to an increase in irreversible capacity caused by decomposition of the electrolytic solution, and deterioration of battery properties such as shelf stability and safety. Recently, in batteries for use in automobiles such as electric cars or hybrid cars, since they sometimes must operate at low temperatures, it has been attempted to use an electrolytic solution containing propylene carbonate (abbreviated below as PC), which is a low melting point liquid (melting point −49° C.), as a nonaqueous solvent. However, graphite powder having a high degree of graphitization causes decomposition of PC, so natural graphite powder cannot be used as it is in batteries as a negative electrode material in combination with a PC-based electrolytic solution (i.e., a nonaqueous electrolytic solution containing propylene carbonate as a solvent).

In order to suppress the reactivity of graphite powder having a high degree of graphitization with an electrolytic solution, there have been many attempts to use a multilayered carbon powder prepared by coating the surface of graphite powder with a carbonaceous material having a low degree of graphitization called turbostratic carbon or low temperature calcined carbon.

JP H08-50897 A1 discloses carbon powder prepared by heating a carbon precursor such as pitch to melt, mixing the resulting melt with graphite powder, and subjecting the mixture to heat treatment at a low temperature to form carbon powder in which the surface of the graphite powder is coated with turbostratic carbon having a low degree of graphitization (low temperature calcined carbon).

JP H04-368778 A1 discloses carbon powder formed by depositing turbostratic carbon with a low degree of graphitization on the surface of graphite powder by the chemical vapor deposition (CVD) method.

Each of the above-described multilayered carbon powders is based on the concept of using graphite powder as a core and coating its entire surface with carbon having a low degree of graphitization in order to suppress its reactivity with an electrolytic solution. Therefore, a large amount of carbon having a low degree of graphitization is used as a coating material.

Carbon having a low degree of graphitization such as low temperature calcined carbon exhibits a gradual change in electrode potential. In addition, it has charge and discharge voltages vs lithium which are higher than those of graphite. Therefore, the use of a multilayered carbon powder having a core of graphite coated with such carbon result in a decreased battery voltage compared to current batteries using graphite alone as a negative electrode material. Accordingly, under actual conditions of use, the multilayered carbon powder produces a battery with a decreased discharge capacity and decreased charge-discharge efficiency. In addition, carbon having a low degree of graphitization such as low temperature calcined carbon has a low true specific gravity compared to graphite, and it is extremely hard. Therefore, with the multilayered carbon powder, the density of an electrode cannot be sufficiently increased by compression, and the discharge capacity per unit volume becomes smaller than that of graphite powder. Furthermore, when pitch which melts when heated is used for coating, if a large amount of pitch is used, the amount of liquid phase formed by heating so increases that aggregation of powder particles occurs during heat treatment. As a result, there is the problem that an additional grinding step becomes necessary, resulting in an increase in costs.

For this reason, it has been proposed to coat a core of graphite powder with a limited amount of carbon having a low degree of graphitization such as low temperature calcined carbon.

JP 2000-58052 A1 discloses a method of manufacturing a carbon material in which graphite powder is immersed in a melt of carbon precursor such as pitch, and after washing the powder with a solvent to remove excess carbon precursor deposited thereon, it is heated to carbonize the deposited carbon precursor. JP H09-213328 A1 discloses a method in which graphite powder is mixed with a carbon precursor such as pitch in a solvent, and the mixture is heated with stirring to remove the solvent and then calcined for carbonization.

These two methods are also based on the concept of using graphite powder as a core material and coating the entire surface of the graphite powder with a carbon powder having a low degree of graphitization to suppress a reaction with an electrolytic solution. In these methods, pitch, which is a carbon precursor, is used in a liquid phase for contact with graphite powder. Therefore, a portion of the pitch is consumed for filling the relatively large pores of the graphite powder. As a result, pitch has to be use in a considerably large amount. If the amount of pitch which is used is insufficient to completely coat the surface of the graphite powder, a portion of the surface of the graphite powder is exposed, and the charge-discharge characteristics in PC-based electrolytic solution cannot be improved to a desired level.

A common problem in the technology disclosed in the above-described patent documents is that due to coating of the entire surface of graphite powder with carbon having a low degree of graphitization, the contact resistance between particles of the resulting carbon powder increases, leading to a decrease in rate capability (i.e., rapid charge characteristics and high rate discharge characteristics) of batteries.

JP 2003-100292 A1 proposes a method in which pitch powder and graphite powder are simply mixed in a solid phase and the mixture is then subjected to heat treatment at a temperature of 600 to 800° C. Since that method is intended to obtain a negative electrode material having a capacity exceeding the theoretical capacity of graphite (372 mAh/g), pitch powder is used in a large amount for mixing with graphite powder. The electrochemical properties of the negative electrode material were tested using a PC-free electrolytic solution, so its charge-discharge characteristics in PC-based electrolytic solutions is unknown. Because this material contains a large amount of pitch-derived low temperature calcined carbon having a low degree of graphitization, it unavoidably has the problems that the battery voltage cannot be increased and that the discharge capacity per unit volume cannot be improved due to its electrode density which cannot be increased.

JP 2003-272625 proposes a graphite material having a controlled pore volume. Specifically, it proposes a graphite material in which the ratio $V2/V1$ is in the range of 2.2-3.0, wherein $V1$ is the pore volume of pores having a diameter of 4-10 nm and $V2$ is the pore volume of pores having a diameter of 30-100 nm. That patent document explains that charging load characteristics are deteriorated when $V2/V1$ is above this range, while if it is below this range, the specific surface area of the material becomes so large that the initial efficiency of a battery decreases. The pore volume in that patent document is determined from the pore size distribution on the adsorption side measured by the BJH (Barrett-Joyner-Halenda) method using nitrogen adsorption. This graphite material is prepared by surface oxidation treatment of graphite particles at 500-1500° C. There is no description in that document concerning electrode density or charge-discharge characteristics in PC-based electrolytic solutions.

SUMMARY OF THE INVENTION

An object of the present invention is to provide an inexpensive carbon powder suitable for use as a negative electrode material for a nonaqueous secondary battery which can be used with an electrolytic solution containing PC (propylene carbonate) as a nonaqueous solvent, i.e., with a PC-based electrolytic solution and which shows suppressed decreases in the electrode density and rate capability (i.e., rapid charge characteristics and high rate discharge characteristics) compared to the prior art multilayered carbon powder described above.

According to the present invention, this object can be achieved by carbon powder which has a certain pore size distribution and which is obtained by simple solids mixing of natural graphite powder and pitch powder followed by heat treatment of the mixture.

In a broad sense, the present invention is a graphite-based carbon powder having a ratio $V2/V1$ of at least 1 wherein $V1$ is the pore volume of pores having a diameter of 2-50 nm and $V2$ is the pore volume of pores having a diameter of 50-200 nm both determined in a pore size distribution curve obtained by analyzing a nitrogen desorption isotherm by the BJH method (Barrett-Joyner-Halenda method).

In a preferred embodiment, the present invention is a carbon powder comprising natural graphite powder having carbon deposited on a portion of the surface thereof, the carbon being derived from a carbon precursor by heat treatment, wherein the carbon powder has a ratio $V2/V1$ of at least 1 where $V1$ is the pore volume of pores having a diameter of 2-50 nm and $V2$ is the pore volume of pores having a diameter of 50-200 nm both determined in a pore size distribution curve obtained by analyzing a nitrogen desorption isotherm by the BJH method.

The carbon derived from a carbon precursor by heat treatment is preferably turbostratic carbon. This carbon can be derived from pitch powder having an average particle diameter of at most 500 μm by performing solids mixing of graphite powder with the pitch powder and subjecting the resulting mixture to heat treatment in a nonoxidizing atmosphere at 900-1500° C. The value of $V2/V1$ ratio is preferably at least 1.3 and at most 2.0.

The turbostratic carbon which is also called low temperature calcined carbon is carbon having a turbostratic structure, which indicates a layered structure of carbon hexagonal network planes in which the network planes do not have crystalline regularity in a direction perpendicular to the planes due to displacement or rotation of a plane relative to the adjacent planes.

In the carbon powder according to the present invention, the entire surface of natural graphite powder which is the base material of the powder is not covered. Instead, only a portion of its surface is covered with low temperature calcined carbon or turbostratic carbon deposited thereon which is formed from a carbon precursor such as pitch by heat treatment for carbonization at a temperature lower than its graphitization temperature. This low temperature calcined carbon preferentially adheres to the edge planes of the graphite powder surface, whereby minute pores (referred to as micropores) mainly opening on the edge planes are filled with this carbon and disappeared from the edge planes, leading to a marked decrease in the number of micropores on the surface of the powder. The cause for this phenomenon is not clear, but it is conjectured to be as follows.

Natural graphite powder is obtained by mechanically grinding natural graphite. The surface of the resulting graphite powder includes basal planes (planes parallel to the cleavage planes formed by grinding) and edge planes (planes approximately perpendicular to the cleavage planes). The edge planes have large surface irregularities, and hence, they are highly active and highly wettable by molten pitch. Therefore, when a mixture of natural graphite powder and a limited amount of pitch powder obtained by solids mixing is subjected to heat treatment, particles of the pitch powder which are distributed discretely between particles of the graphite powder melt at an initial stage of heat treatment, and when the resulting small masses of molten pitch contact the surrounding particles of natural graphite powder, the edge planes of the surface of the graphite particles are preferentially wet by molten pitch, whereby micropores which primarily exist in the edge planes are filled by molten pitch. Pitch adhering to the edge planes is then carbonized during heat treatment and converted into low temperature calcined carbon.

Relatively large pores which are present primarily in the interior of graphite powder particles (referred to as macropores) remain without being filled by pitch even if the particles are contacted by molten pitch. Thus, with a carbon powder prepared by solids mixing of graphite powder with a limited amount of pitch powder followed heat treatment, while a considerable number of micropores opening on the surface of natural graphite powder are eliminated, almost all of the macropores of the graphite powder remain. Therefore, the proportion of macropores with respect to micropores of the carbon powder is much higher than that of the graphite powder.

According to the present invention, micropores are defined as pores having a pore diameter of 2-50 nm, and macropores are defined as pores having a pore diameter of 50-200 nm. By making the ratio of the pore volume of macropores to the pore volume of micropores at least a certain value, not only is charge-discharge characteristics in PC-based electrolytic solutions markedly improved, but the electrode density can also be increased, and an inexpensive carbon powder can be provided which makes it possible to produce nonaqueous secondary batteries having a high battery discharge capacity and good rate capability.

As described below, pores having a pore diameter of 2-50 nm are technically referred to as mesopores, but in the present invention, they are referred to as micropores in order to distinguish them from macropores having a pore diameter of 50-200 nm.

Decomposition of an electrolytic solution can occur over the entire surface of graphite powder, but it tends to occur particularly markedly on edge planes of the surface. In the carbon powder according to the present invention, since the edge planes of graphite powder surface are selectively reformed by deposition thereon with a low temperature calcined carbon so as to eliminate micropores, the carbon powder has a decreased tendency to cause decomposition of electrolytic solutions and has greatly improved charge-discharge characteristics in electrolytic solutions and particularly in PC-based electrolytic solutions. On the other hand, the large macropores present inside the powder particles are easily crushed by the action of pressure applied when the powder is formed into electrodes. Therefore, the electrode density is easily increased by compression, and the discharge capacity of batteries with a prescribed volume can be increased.

Some edge planes are present on the wall surface of macropores. When the pressure applied at the time of forming electrodes is low, there is the possibility that an electrolytic solution enters into the interior of macropores whereby a PC-based electrolytic solution is decomposed. However, in the manufacture of batteries having a high capacity, since an electrode is formed by compression with a high pressure in order to obtain a high electrode density, macropores are crushed by the pressure, and edge planes present inside the powder particles are no longer contacted by electrolytic solutions. Accordingly, charge-discharge characteristics in PC-based electrolytic solutions is thought to be markedly improved even if macropores are not filled with low temperature calcined carbon.

In a carbon powder according to the present invention, only the edge planes of graphite powder are reformed by being selectively covered with low temperature calcined carbon, and the basal planes remain exposed without being covered. Therefore, in spite of the graphite powder surface being partially covered with low temperature calcined carbon having inferior conductivity, an increase in contact resistance between powder particles due to covering is avoided. As a result, it has a contact resistance which is kept at the same low level as for graphite, and a decrease in rate capability is avoided. The amount of low temperature calcined carbon which is harder and lighter than graphite is small in a carbon powder according to the present invention. Therefore, a decrease in true specific gravity due to the presence of low temperature calcined carbon is decreased, and a decrease in electrode density is also suppressed.

When pitch is previously heated to melt and the resulting pitch in liquid is then mixed with graphite powder, in contrast to when solids mixing is carried out, molten pitch is present in a continuous state rather than in a discrete state in the case of solids mixing. By the action of a shear force which is applied at the time of mixing, the molten pitch is spread and consumed by coating the basal planes of the graphite powder surfaces or by filling macropores in addition to filling micropores. The pitch is then carbonized to form low temperature calcined carbon by heat treatment. Accordingly, unlike in the present invention, selective filling of only micropores and elimination thereof do not take place. As a result, the pore volume distribution does not greatly differ from that of natural graphite powder used as a base material, and the ratio of macropores to micropores is much smaller than in the present invention. In addition, the thickness of calcined carbon coating is smaller due to its spreading. Therefore, when the amount of pitch is small, the coating may have defects due to contraction of the coating at the time of carbonizing. Accordingly, compared to the case of solids mixing with the same amount of pitch, it is more difficult to increase the electrode density, and decomposition of PC-based electrolytic solutions occurs more easily. In addition, since the entire surface of graphite powder is coated with low temperature calcined carbon having inferior electrical conductivity, the rate capability is worsened.

In the present invention, solids mixing means mixing in a state in which a liquid component is not present, i.e., a state in which each component being mixed does not become a liquid during mixing and in which a liquid medium for facilitating mixing is not present.

The present invention can inexpensively provide a carbon powder suitable for use as a negative electrode material for a nonaqueous secondary battery and capable of producing an electrode having excellent charge-discharge characteristics in PC-based electrolytic solutions and having good rate capability and high electrode density (and hence good discharge capacity in a battery). A nonaqueous secondary battery comprising a negative electrode produced from a carbon powder according to the present invention can be used in applications possibly involving use at low temperatures, such as in automobiles.

DESCRIPTION OF PREFERRED EMBODIMENTS

Carbon powder according to the present invention is characterized in that it has a ratio V2/V1 of at least 1 wherein V2 is the pore volume of pores having a diameter of 50-200 nm and V1 is the pore volume of pores having a diameter of 2-50 nm both determined in a pore size distribution curve obtained by analysis of a nitrogen desorption isotherm by the BJH method.

Pores with a pore diameter of 2-50 nm are micropores, and pores with a pore diameter of 50-200 nm are macropores. Accordingly, in a carbon powder according to the present invention, the pore volume of macropores (V2) is equal to or larger than the pore volume of micropores (V1).

With natural graphite powder obtained by mechanically grinding natural graphite, the pore volume V1 of micropores is larger than the pore volume V2 of macropores. Therefore, the value of V2/V1 ratio becomes considerably smaller than 1 (such as in the range of 0.65-0.85). Thus, carbon powder according to the present invention is characterized in that the proportion of the pore volume constituted by macropores is higher than in natural graphite powder.

Pores with a diameter of 2-50 nm are technically classified as mesopores. The most common method of measuring the pore volume of mesopores and larger pores is mercury porosimetry. However, when this method is applied to relatively soft particles such as natural graphite particles, it has the problem that the particles deform due to the pressure of mercury which is a heavy liquid, and accurate measurement cannot be carried out.

In the present invention, the pore volume is determined by a method in which a nitrogen desorption isotherm is analyzed by the BJH method. This method is known to be suitable for measuring the pore size distribution of mesopores and larger pores. The measurement of pore size distribution of a porous material by nitrogen gas desorption and analysis of the measured result by the BJH method can be performed along with the measurement of specific surface area using an automatic surface area and porosity measuring system sold by Shimadzu Corporation, for example. The pore volume in a specific pore diameter range can be found from the pore size distribution.

If the value of V2/V1 is smaller than 1, as stated above concerning the case in which pitch is previously melted and mixed with graphite powder, not only does the charge-discharge characteristics in PC-based electrolytic solutions become inferior, but rate capability and electrode density (and hence the discharge capacity of a battery) also become poor. The value of V2/V1 is preferably at least 1.3 and at most 2.0. If the value of V2/V1 is at least 1.3, the effect of improving electrode density and charge-discharge characteristics in PC-based electrolytic solutions is even greater. It is difficult to obtain a carbon powder having a ratio V2/V1 of greater than 2.0 utilizing an industrially applicable method.

Carbon powder according to the present invention having a value for V2/V1 of at least 1 is a graphite-based powder. More specifically, the carbon powder is natural graphite powder having its surface reformed with carbon formed from a carbon precursor by heat treatment (low temperature calcined carbon) which adheres to a portion of the surface of the graphite powder. As stated earlier, low temperature calcined carbon preferentially adheres to the edge planes of the surface of mechanically ground natural graphite powder and fills micropores present primarily in the edge planes. Therefore, the proportion of micropores in carbon powder according to the present invention is decreased, and the ratio V2/V1 becomes at least 1.

The carbon powder can be prepared by performing solids mixing of natural graphite powder with a powder of a carbon precursor and preferably with pitch powder having an average particle diameter of at most 500 μm and then performing heat treatment of the resulting mixture in a nonoxidizing atmosphere at 900-1500° C. Below, the present invention will be explained using carbon powder prepared by this method as an example.

The base material of carbon powder according to the present invention is natural graphite powder. The theoretical capacity vs lithium of graphite is lower than that of amorphous carbon when compared by capacity per unit mass, but it is higher than that of amorphous carbon when compared by capacity per unit volume. In addition, graphite has a narrow voltage range in which lithium can enter and exit. Therefore, in a battery for practical purpose having a given volume, graphite can exhibit a higher discharge capacity than amorphous carbon.

Graphite includes natural graphite, synthetic graphite, and kish graphite. In order to increase the discharge capacity in a battery for practical purpose, use of graphite having a high degree of graphitization is advantageous. On this account, powder of natural graphite which has a high degree of graphitization and is inexpensive is used as a base material in the present invention. However, synthetic graphite powder and/or kish graphite powder can be used together with natural graphite powder in a small amount (at most 30 mass percent and preferably at most mass percent of the overall graphite powder).

Natural graphite powder is manufactured by grinding natural graphite. Preferably spheroidized graphite powder is used as natural graphite powder. Spheroidized graphite powder has a nearly spherical shape formed by folding flaky graphite particles, and it can be manufactured by employing a special grinding technique (spheroidizing grinding). Such a product is commercially available. By use of graphite powder with a particle shape close to spherical, electrode anisotropy is minimized and cycle performance are improved. In addition, appropriate voids are introduced in an electrode produced from such graphite powder, thereby improving the degree of impregnation of the electrode with an electrolytic solution. As a result, the electrolytic solution can be uniformly infiltrated into the electrode, leading to improvement in low temperature characteristics and rate capability.

The volume of pores having a diameter of 50-200 nm (namely, the pore volume of macropores) in the natural graphite powder used as a base material is preferably at least 0.005 cm$^3$/g. If the graphite powder has a pore volume of macropores which is smaller than this level, it is difficult for the electrode density to increase after surface reformation.

Preferably, the average particle diameter of the natural graphite powder is in the range of 5-30 μm. If the average particle diameter is too small, a large amount of pitch becomes necessary for surface reformation of the graphite powder. On the other hand, if the average particle diameter of the natural graphite powder is too large, it tends to produce electrodes having surface irregularities which is large enough to cause battery short circuits. In the present invention, the term average particle diameter means the particle diameter D50 which is the particle diameter at a point of 50% volume fraction in a cumulative particle size distribution.

It is also preferable that the natural graphite powder have a specific surface area of at most 20 m$^2$/g and more preferably at most 10 m$^2$/g. If the specific surface area is too large, the amount of pitch necessary for surface reformation of the graphite powder becomes large. As described below, the specific surface area of carbon powder according to the present invention obtained by heat treatment after solids mixing of natural graphite powder with pitch is greatly decreased compared to that of the natural graphite powder used.

The carbon precursor used in surface reformation of natural graphite powder is preferably one which is solid at room temperature and which melts during heat treatment. Although various types of solid hydrocarbons can be used, it is preferable to use pitch as a carbon precursor from the standpoints of cost and performance.

Pitch may be any of petroleum-derived and coal-derived pitches. Pitch is used in the form of a powder in order to perform solids mixing with natural graphite powder. The average particle diameter of pitch powder is preferably at most 500 μm and more preferably at most 100 μm. If the average particle diameter of pitch powder is too large, sufficient surface reformation of graphite powder cannot be achieved by solids mixing followed by heat treatment, resulting in the formation of carbon powder having deteriorated charge-discharge characteristics in PC-based electrolytic solutions. On the other hand, it is advantageous for the pitch powder to have a small average particle diameter from the standpoint that contact points with graphite powder increase. However, in some types of pitch, if it has an extremely small average particle diameter, it tends to agglomerate easily. Accordingly, the average particle diameter of the pitch powder which is used can be suitably selected taking productivity into consideration. The average particle diameter of pitch powder is preferably at least 15 μm.

It is also preferable that the pitch powder which is used has a softening point of not higher than 180° C. and more preferably in the range of 80-150° C. If the pitch powder has a softening point of up to 180° C., it is sufficiently melted during heat treatment and molten pitch can easily flow and adhere to the edge planes of the surface of graphite particles which are not in contact with the pitch. If its softening point is at least 80° C., it is easy to obtain pitch powder having a controlled particle diameter since during grinding of pitch to form pitch powder having a predetermined particle diameter, it is difficult for the pitch to melt by the heat generated by mechanical grinding. Such a softening point is also advantageous from the standpoint of storage since it minimizes the possibility of melting of the powder during storage.

Mixing of natural graphite powder with pitch powder is carried out by simple solids mixing. The proportion of pitch powder is determined such that carbon powder for which the value of V2/V1 is at least 1 is obtained after solids mixing and heat treatment. This is achieved by coating only a portion of the surface of the graphite powder with low temperature calcined carbon derived from pitch. If the proportion of pitch powder is too small or too large, it is not possible to obtain carbon powder for which the value of V2/V1 is at least 1.

The proportion of pitch powder is preferably such that the condition expressed by the inequality 0.3<W/S1<2.0 is satisfied, wherein W is the amount of pitch powder (parts by mass) with respect to 100 parts by mass of graphite powder and S1 is the specific surface area of the graphite powder (m$^2$/g). In the range specified by 0.3<W/S1<2.0, it is possible to increase the electrode density and increase the capacity of a battery. If pitch powder is mixed in an amount higher than this range, the amount of low temperature calcined carbon which is formed becomes large, the electrode density no longer increases, and rate capability decreases. The amount of pitch powder is more preferably in the range specified by 0.5<W/S1<2.0. If the amount of pitch powder is smaller than this range, surface reformation of the graphite powder may become inadequate, leading to a decrease in charge-discharge characteristics in PC-based electrolytic solutions.

Solid phase mixing of natural graphite powder and pitch powder may be carried out by simple mixing using a suitable dry mixing apparatus (a blender, a mixer, or the like).

The mixture obtained by solids mixing natural graphite powder and pitch powder is subjected to heat treatment to cause the pitch powder to melt and then carbonize. As described earlier, during this heat treatment, the edge planes of the natural graphite powder surface are preferentially wet by molten pitch, so the molten pitch preferentially adheres to the edge planes so as to fill micropores primarily present in the edge planes. As a result, after heat treatment, the micropores partly disappears due to filling with the low temperature calcined carbon formed from pitch by heat treatment. In this manner, a carbon powder according to this present invention in which the pore volume V2 of macropores is equal to or larger than the pore volume V1 of micropores is obtained.

The heat treatment temperature is preferably in the range of 900-1500° C. If it is lower than this range, the low temperature calcined carbon formed by carbonization of pitch powder has a decreased charge-discharge efficiency, leading to a decrease in charge-discharge efficiency of the entire carbon powder. In addition, the low temperature calcined carbon has a decreased electrical conductivity, which makes the rate capability and cycle performance inadequate. On the other hand, if the heat treatment temperature is higher than 1500° C., crystallization of carbon is promoted, resulting in the formation of carbon powder which readily causes decomposition of PC and has a decreased charge-discharge characteristics in PC-based electrolytic solutions. In order to avoid combustion of carbon, heat treatment is carried out in an inert atmosphere. From the standpoint of cost, a nitrogen atmosphere is preferred. The duration of heat treatment depends upon the temperature and the proportion of pitch powder, but normally it is in the range from several tens of minutes to several hundred hours. Preferably heat treatment of the powder mixture is carried out in a stationary state without agitation.

During heat treatment, molten pitch fills the micropores in the graphite powder surface, resulting in a decrease in specific surface area of the graphite powder. In addition, some crystal defects on the surface of graphite powder are eliminated due to the heat during heat treatment, which also contributes to a decrease in specific surface area of the graphite powder. Accordingly, the carbon powder obtained by heat treatment has a specific surface area which is markedly decreased compared to the specific surface area of the natural graphite powder used as a raw material. On the other hand, as the amount of pitch-derived low temperature calcined carbon deposited on the graphite powder is small, there is almost no change in the average particle diameter between the raw material graphite powder and the resulting carbon powder.

The carbon powder according to the present invention which is obtained by heat treatment has a pore size distribution such that the ratio V2/V1 of the pore volume V2 of macropores to the pore volume V1 of micropores is at least 1. Like the raw material graphite powder, this carbon powder preferably has an average particle diameter in the range of 5-30 μm. If the average particle diameter of the carbon powder is too small, agglomeration of the carbon powder tends to occur easily, and when a slurry is formed from the powder at the time of electrode manufacture, it becomes difficult to perform application of the slurry. On the other hand, if the average particle diameter is too large, big irregularities which may cause short circuits of a battery may develop on an electrode surface. The specific surface area of carbon powder according to the present invention is preferably at most 4.0 m$^2$/g. With carbon powder having a larger specific surface area than this level, a large amount of solvent is required at the time of electrode manufacture, thereby making electrode manufacture difficult, and the charge-discharge efficiency also decreases.

In the present invention, since the proportion of pitch which is melted during heat treatment is considerably small, there is almost no occurrence of aggregation and fusion of carbon powder during heat treatment. Accordingly, it is generally not necessary to perform a grinding step after heat treatment, which is advantageous from the standpoint of cost. However, in some cases, carbon powder obtained by heat treatment may be lightly disintegrated.

Carbon powder according to the present invention is suitable for use as a negative electrode material in the manufacture of negative electrodes for nonaqueous secondary batteries. The manufacture of a negative electrode and the fabrication of a secondary battery may be carried out in a known conventional manner. A brief explanation in this respect will be given below, but this explanation is no more than an example, and other methods and structures are possible.

In the manufacture of a negative electrode, a slurry is formed by mixing carbon powder used as a negative electrode material with a suitable binder and a solvent therefor and optionally a suitable conductive material for increasing electrical conductivity. If necessary, mixing can be carried out using a homogenizer or glass beads. The slurry is applied to a suitable current collector material (such as a rolled copper foil or an electrodeposited copper foil) using a doctor blade or other technique, and after drying, the applied layer is compressed by rolling or the like, thereby forming a negative electrode. As stated above, macropores of graphite are easily crushed at the time of this compression, resulting in an increase in the electrode density.

The binder which can be used includes fluoropolymers such as polyvinylidene fluoride and polytetrafluoroethylene, resinous polymers such as carboxymethylcellulose, and elastomeric polymers such as styrene-butadiene rubber. The solvent for the binder may be N-methylpyrrolidone, water, or the like. The conductive material may be a carbonaceous material or a metal (such as Ni). The carbonaceous material which can be used as a conductive material includes synthetic graphite, natural graphite, carbon black, acetylene black, and the like, and it may be in powder form or in fiber form.

The basic structure of a nonaqueous secondary battery includes a negative electrode, a positive electrode, a separator, and a nonaqueous electrolytic solution. In the present invention, there are no particular restrictions on the battery structure, and the shape of the battery is not particularly restricted. For example, it may be cylindrical, rectangular, coin-shaped, sheet-shaped, or the like.

The nonaqueous electrolytic solution may contain PC (propylene carbonate) as a solvent since the carbon powder according to the present invention from which a negative electrode is prepared has good charge-discharge characteristics in PC-based electrolytic solutions and does not easily cause decomposition of PC. The term PC-based electric solutions indicate any solutions in which the solvent contains PC in a significant amount, for example, in an amount of at least 10% and preferably at least 30% by volume of the solvent.

EXAMPLES

Next, the effects of the present invention will be explained more specifically by examples. In the examples, unless otherwise specified, parts refer to parts by mass. The average particle diameter is the particle diameter at a point of 50% volume fraction in a cumulative particle size distribution.

Example 1

Natural graphite powder which was prepared by spheroidizing grinding of natural graphite was used as a base material to prepare carbon powder. The graphite powder had an average particle diameter of 20 μm, a specific surface area of 5.2 m$^2$/g, a pore volume of 0.0110 cm$^3$/g for pores with a diameter of 50-200 nm which was determined on a pore size distribution curve obtained by analyzing a nitrogen desorption isotherm by the BJH method, and a Raman spectrum ratio R of 0.19 which is the ratio of the peak strength in the vicinity of 1360 cm$^{-1}$ with respect to the peak strength in the vicinity of 1580 cm$^{-1}$ in an argon ion laser Raman spectrum.

100 parts of this natural graphite powder was mixed with 5 parts of coal tar is pitch powder having an average particle diameter of 35 μm and a softening point of 80° C. by simple solids mixing in a V blender. The resulting powder mixture was placed into a graphite crucible and subjected to heat treatment for one hour at 1000° C. in a nitrogen gas stream to prepare carbon powder.

The pore size distribution and the specific surface area of the resulting carbon powder were measured by analysis of a nitrogen desorption isotherm by the BJH method using Micromeritix ASAP (Accrelated Surface Area and Porosimetry) system model 2010 to determine the ratio of the pore volume V2 of pores having a diameter of 50-200 nm to the pore volume V1 of pores having a diameter of 2-50 nm. The ratio V2/V1 of the carbon powder prepared in this example was 1.60, which was in the range of at least 1 defined by the present invention. In this measurement, the temperature and duration of pretreatment of the sample which was performed before measurement were 200° C.×3 hours.

In order to validate the invention described in above-mentioned JP 2003-272625 A1, the ratio V3/V4 of the pore volume V3 of pores with a diameter of 4-10 nm to the pore volume V4 of pores with a diameter of 30-100 nm was determined on the carbon powder product in the same manner as described above from a pore size distribution curve obtained on the adsorption side. The ratio V3/V4 of the carbon powder was 4.84, which was outside the range specified in that patent document.

Example 2

Carbon powder was prepared in the same manner as described in Example 1 except that the amount of pitch powder was changed to 9 parts. The resulting carbon powder had a value of V2/V1 of 1.11 and a value of V4/V3 of 1.87.

A sample of the carbon powder prepared in Example 2 was observed with a TEM (transmission electron microscope). In a location of the surface of the carbon powder in which edge planes and basal planes could be clearly distinguished, a structure was observed in which turbostratic carbon (pitch-derived, low temperature calcined carbon having a turbostratic crystal structure) selectively adheres to the edge planes.

Comparative Example 1

Carbon powder was prepared in the same manner as described in Example 1 except that the amount of pitch powder was changed to 13 parts. The resulting carbon powder had a value of V2/V1 of 0.62 and a value of V4/V3 of 1.89. Thus, the value of V2/V1 was smaller than 1. This is thought to be due to the high proportion of pitch powder relative to natural graphite powder, whereby not only micropores but also macropores were filled by low temperature calcined carbon, resulting in a decrease in the pore volume V2 of macropores.

Example 3

Natural graphite powder which was prepared by spheroidizing grinding of natural graphite was used as a base material to prepare carbon powder. The graphite powder had an average particle diameter of 29 μm, a specific surface area of 3.5 m$^2$/g, a pore volume of 0.0072 cm$^3$/g for pores with a diameter of 50-200 nm which was determined on a pore size distribution curve obtained by analyzing a nitrogen desorption isotherm by the BJH method, and a ratio R of the peak strength in the vicinity of 1360 cm$^{-1}$ with respect to the peak strength in the vicinity of 1580 cm$^{-1}$ in an argon ion laser Raman spectrum of 0.16.

100 parts of this natural graphite powder was mixed with 5 parts of coal tar pitch powder having an average particle diameter of 35 μm and a softening point of 80° C. by simple solids mixing in a V blender. The resulting powder mixture was placed into a graphite crucible and subjected to heat treatment for one hour at 950° C. in a nitrogen gas stream to prepare carbon powder. The value of V2/V1 of the resulting carbon powder was 1.40 and the value of V4/V3 thereof was 2.15.

Comparative Example 2

This example illustrates the preparation of carbon powder using the same natural graphite powder and pitch powder as used in Example 1 in the same proportions, but instead of employing solids mixing, liquid state mixing with heating and stirring was carried out at a temperature above the melting temperature of the pitch using a diluting solvent.

100 parts of natural graphite powder which was prepared by spheroidizing grinding of natural graphite were mixed with 5 parts of coal tar pitch powder having a softening point of 80° C. and 100 parts of pyridine as a diluting solvent while stirring and heating at 110° C. The natural graphite powder had an average particle diameter of 20 μm, a specific surface area of 5.2 m$^2$/g, a pore volume of pores with a diameter of 50-200 nm in a pore size distribution curve obtained by analysis of a nitrogen desorption isotherm by the BJH method of 0.0110 cm$^3$/g, and a ratio R of the peak strength in the vicinity of 1360 cm$^{-1}$ with respect to the peak strength in the vicinity of 1580 cm$^{-1}$ in an argon ion laser Raman spectrum of 0.19. The solvent was then evaporated and recovered at a reduced pressure. The powder mixture obtained by this liquid state mixing was placed into a graphite crucible and subjected to heat treatment for 1 hour at 1000° C. under a nitrogen gas stream to prepare carbon powder. The resulting carbon powder had a value of V2/V1 of 0.95 and its value of V4/V3 was 2.01.

Comparative Example 3

Carbon powder was prepared in the same manner as in Comparative Example 2 except that the amount of pitch powder was changed to 9 parts. The value of V2/V1 for this carbon powder was 0.81 and its value of V4/V3 was 1.70.

Comparative Example 4

Carbon powder was prepared in the same manner as in Comparative Example 2 except that the amount of pitch powder was changed to 13 parts. The value of V2/V1 for this carbon powder was 0.59, and its value of V4/V3 was 1.62.

Comparative Example 5

The values of V2/V1 and V4/V3 were determined on the natural graphite powder used as a base material in Examples 1-2 and Comparative Examples 1-4 which was prepared by spheroidizing grinding of natural graphite. The value of V2/V1 was 0.72, and the value of V4/V3 was 4.05.

Comparative Example 6

The values of V2/V1 and V4/V3 were determined on the natural graphite powder used as a base material in Example 3 which was prepared by spheroidizing grinding of natural graphite. The value of V2/V1 was 0.80, and the value of V4/V3 was 4.09.

Data on the pore volume ratios (V2/V1 and V4/V3) of the carbon or graphite powder prepared or used in the above examples are shown in Table 1 together with the specific surface area (measured by the nitrogen gas BET adsorption method).

Preparation of Electrodes

To a mixture of the carbon powder prepared in each of the above examples with carboxymethylcellulose (CMC) powder, a dispersion of styrene butadiene rubber (SBR) in water was added and stirred to form a slurry. Both of CMC and SBR were binders. The mass ratio of carbon powder:CMC:SBR was 97:1:2. The slurry was applied to a Cu foil having a thickness of 17 μm using a doctor blade. After drying, the applied layer on Cu foil was punched to form disks with a diameter of 13 mm. The punched disks were compressed at different pressures in a press to obtain electrodes.

The density of an electrode was determined by measurement of its thickness with a micrometer and measurement of its mass. The thickness and mass of the Cu foil in each electrode were previously measured, and they were subtracted from the corresponding measured values of the electrode to determine the density of the portion of the electrode material excluding the Cu foil. Evaluation of electrode density was carried out by the pressure sufficient to obtain an electrode density of 1.75 g/cm$^3$. When an electrode density of 1.75 g/cm$^3$ was not obtained even at a pressure of 150 MPa, the density of an electrode which was compressed at a pressure of 150 MPa was used for evaluation.

Properties of Electrodes (1) Charge-Discharge Characteristics in PC-Based Electrolytic Solutions A coin-shaped cell for testing was assembled using a test electrode which was prepared as above and which had a density of 1.75 g/cm$^3$ or, if such density is impossible, were compressed at a pressure of 150 MPa, an electrode made of Li metal foil as a counter electrode, a polyolefin separator, and an electrolytic solution which was a 1M solution of LiPF$_6$ as a supporting electrolyte dissolved in a mixed solvent of ethylene carbonate (EC), propylene carbonate (PC), and dimethyl carbonate (DMC) at a volume ratio of EC:PC:DMC=1:2:1. The coating weight of the carbon powder on Cu foil in each test electrode was 10-11 mg/cm$^2$. The electrode properties of the coin-shaped cell prepared in this manner were evaluated as follows.

At a constant current of 25 mA/g, doping of the test electrode (intercalation of lithium ion into the electrode) was performed until the potential of the electrode became 0 V vs the counter electrode and then doping was continued while maintaining a constant voltage of 0 V until the value of 5 μA/cm$^2$ was reached (this step corresponding to charge of a lithium ion battery). Next, at a constant current of 25 mA/g, undoping of the test electrode (withdrawal of lithium ions from the electrode, corresponding to discharge of a lithium ion battery) was carried out until its potential difference became 1.5 V vs the counter electrode. Since the undoping capacity of the test electrode corresponded to the discharge capacity when it was used as a negative electrode in a battery, it was recorded as the discharge capacity. The value of the discharge capacity (undoping capacity) divided by the charge capacity (doping capacity) which is the charge-discharge efficiency (expressed as a percent) was recorded as the charge-discharge characteristics in PC-based electrolytic solutions. All the tests were carried out at 23° C.

(2) Rate Capability

A coin-shaped cell for testing was assembled in the same manner as in (1) above except that the electrolytic solution used was a 1M solution of LiPF$_6$ as a supporting electrolyte dissolved in a mixed solvent of ethylene carbonate (EC) and ethyl methyl carbonate (EMC) at a volume ratio of EC:EMC=1:3 and that the coating weight of the carbon powder on Cu foil in each test electrode was 5-6 mg/cm$^2$.

First cycle: Doping was performed at a constant current of 25 mA/g until the potential difference of the test electrode became 0 V vs the counter electrode, and doping was continued while maintaining a constant voltage of 0 V until the value of 5 μA/cm$^2$ was reached. Undoping was then carried out at a constant current of 25 mA/g until the potential difference of the test electrode reached 1.5 V vs the counter electrode.

Second cycle: Doping was carried out at a constant current of 0.05 C until the potential difference reached 5 mV vs the counter electrode, and doping was continued while maintaining a constant voltage of 5 mV until 10 μA/cm² was reached. Undoping was then carried out at a constant current of 0.05 C until a potential difference of 1.5 V was reached.

Third cycle: Doping was carried out at a constant current of 0.05 C until the potential difference reached 5 mV vs the counter electrode, and doping was continued while maintaining a constant voltage of 5 mV until 10 μA/cm² was reached. Undoping was then carried out at a constant current of 1.5 C until a potential difference of 1.5 V was reached.

The ratio of the discharge capacity (undoping capacity) in the third cycle to that in the second cycle was calculated and used to evaluate the rate capability.

The above test results are also shown in Table 1.

good rate capability (1.5 C/0.05 C discharge capacity ratio). Accordingly, they can be used as a negative electrode material in a nonaqueous secondary battery which needs to be able to resist low temperatures such as a battery for automobiles for which a PC-based electrolytic solution is used.

Even if the same surface reforming treatment as in Examples 1-3 was carried out on natural graphite powder, in Comparative Example 1 in which the proportion of pitch was too large, the ratio V2/V1 was less than 1, and it was smaller even when compared to the value of V2/V1 of the untreated graphite powder used as a raw material (the graphite powder of Comparative Example 5). This means that a large number of macropores were filled up with pitch-derived carbon. In this case, macropores were not crushed by the application of pressure when electrodes are prepared, so even at a pressure of 150 MPa, the electrode density only reached 1.67 g/cm³, and it had inferior electrode density, leading to a decrease in

TABLE 1

|  | Method of mixing of pitch powder | Amount of pitch added (parts) | V2/V1 | V4/V3 | Specific surface area (m²/g) | Applied pressure when electrode density = 1.75 g/cm³ (MPa) | Electrode density when 150 MPa pressure applied (g/cm³) | Charge-discharge characteristics in PC-based electrolytic solutions (%) | Rate capability (1.5C/0.05C discharge capacity ratio) |
|---|---|---|---|---|---|---|---|---|---|
| Example 1 | solids mixing | 5 | 1.60 | 4.84 | 2.5 | 120 |  | 80 | 99.5 |
| Example 2 | solids mixing | 9 | 1.11 | 1.87 | 1.7 | 150 |  | 83 | 99.0 |
| Comparative Example 1 | solids mixing | 13 | 0.62 | 1.89 | 1.2 | >150 | 1.67 | 84 | 98.0 |
| Example 3 | solids mixing | 5 | 1.40 | 2.15 | 1.5 | 90 |  | 80 | 99.3 |
| Comparative Example 2 | mixing with heating | 5 | 0.95 | 2.01 | 2.0 | 130 |  | 0 | 98.0 |
| Comparative Example 3 | mixing with heating | 9 | 0.81 | 1.70 | 1.5 | >150 | 1.71 | 5 | 97.5 |
| Comparative Example 4 | mixing with heating | 13 | 0.59 | 1.62 | 1.1 | >150 | 1.65 | 81 | 97.0 |
| Comparative Example 5 | Untreated | 0 | 0.72 | 4.05 | 5.2 | 60 |  | 5 |  |
| Comparative Example 6 | " | 0 | 0.80 | 4.09 | 3.5 | 50 |  | 0 |  |

V1 = pore volume of pores with a diameter of 2-50 nm (measured on desorption isotherm)
V2 = pore volume of pores with a diameter of 50-200 nm (measured on desorption isotherm)
V3 = pore volume of pores with a diameter of 4-10 nm (measured on adsorption isotherm)
V4 = pore volume of pores with a diameter of 30-100 nm (measured on adsorption isotherm)

As can be seen from Table 1, the untreated natural graphite powders used in Comparative Examples 5 and 6 had an extremely low pressure necessary to obtain an electrode density of 1.75 g/cm³, so they were excellent in terms of electrode density. However, their charge-discharge characteristics in PC-based electrolytic solutions is extremely poor, and therefore they cannot be used in an electrolytic solution containing PC. Though these natural graphite powders were spheroidized by grinding, the value of V2/V1 was considerably smaller than 1.

In contrast, all the carbon powders according to the present invention (prepared in Examples 1-3) which have a pore size distribution such that the value of V2/V1 is at least 1 could achieve an electrode density of 1.75 g/cm³ with a pressure of at most 150 MPa. Accordingly, these carbon powders had a good electrode density. Nevertheless, they had markedly improved charge-discharge characteristics in PC-based electrolytic solutions, so they can be used without problems in an electrolytic solution containing PC. In addition, they had a discharge capacity of a battery. In addition, the rate capability became worse to some degree.

Although not shown in the table, when the amount of pitch is too small, the value of V2/V1 becomes smaller than 1 as can be inferred from Comparative Examples 5 and 6. In this case, although the electrode density is good, charge-discharge characteristics in PC-based electrolytic solutions becomes poor as expected from Comparative Examples 5 and 6.

As shown in Comparative Examples 2-4, even if the same natural graphite powder and pitch powder were used, when the mixing method was not solids mixing but the pitch powder was mixed in liquid (molten) state, it was difficult to obtain carbon powder having a value of V2/V1 of at least 1. This is because the pitch uniformly and thinly adhered to the surface of the natural graphite powder. As a result, in Comparative Examples 2 and 3 in which the amount of pitch was small, surface reforming of the edge portions of the graphite powder surface was not sufficient, so charge-discharge characteristics in PC-based electrolytic solutions worsened to the same level as for an untreated material. In addition, the electrode density decreased compared to the case when the same proportion of pitch was mixed by solids mixing. On the other hand, in Comparative Example 4 in which the amount of pitch was large, the charge-discharge characteristics in PC-based electrolytic solutions was improved. This is thought to be because a sufficient amount of low temperature calcined carbon adhered to the edge planes of natural graphite powder surface to achieve surface reforming. However, the electrode density was extremely low.

When the carbon powder of Comparative Example 3 was observed with a TEM, a structure like that observed with the powder of Example 2 in which turbostratic carbon selectively adhered to the edge planes of graphite powder surface was not observed.

From the above, it can be seen that carbon powder which has a value of V2/V1 of at least 1 can serve as a negative electrode material having a high electrode density, excellent charge-discharge characteristics in PC-based electrolytic solutions, and good rate capability.

In contrast, the value of V4/V3 varied with extremely high dispersion. Although it appears that there is a tendency for the electrode density to increase as this ratio increases, there was no clear correlation of this ratio with charge-discharge characteristics in PC-based electrolytic solutions, and no particular correlation of the ratio V4/V3 with the ratio V2/V1.

For example, as shown in Comparative Examples 5 and 6, although the value of V4/V3 of untreated graphite powder is large, if surface reforming is carried out according to the present invention, there are cases in which the value of V4/V3 increases as in Example 1 and in which it decreases as in Examples 2 and 3. In Examples 1-3 in which the value of V4/V3 increased and decreased, charge-discharge characteristics in PC-based electrolytic solutions improved regardless of the value of V4/V3.

What is claimed is:

1. A carbon powder comprising natural graphite powder having turbostratic carbon deposited on a portion of the surface thereof, wherein the carbon powder has a ratio of V2/V1 of at least 1 wherein V1 is the pore volume of pores having a diameter of 2-50 nm and V2 is the pore volume of pores having a diameter of 50-200 nm both determined in a pore size distribution curve obtained by analyzing a nitrogen desorption isotherm by the BJH method.

2. A process for preparing a carbon powder as claimed in claim 1 comprising performing solids mixing of pitch powder having an average particle diameter of at most 500 μm with graphite powder and then performing heat treatment of the resulting mixture in a nonoxidizing atmosphere at a temperature of 900-1500° C.

3. A carbon powder as claimed in claim 1 wherein the ratio V2/V1 is at least 1.3 and at most 2.0.

* * * * *